(12) United States Patent
Sawai et al.

(10) Patent No.: US 8,132,735 B2
(45) Date of Patent: Mar. 13, 2012

(54) RECORDING MEDIUM AND APPARATUS FOR HOLDING THE SAME

(75) Inventors: Jun Sawai, Kanagawa (JP); Noboru Oya, Kanagawa (JP); Tsutomu Shimosato, Tokyo (JP)

(73) Assignee: Sony Corporation, Tokyo (JP)

( * ) Notice: Subject to any disclaimer, the term of this patent is extended or adjusted under 35 U.S.C. 154(b) by 1423 days.

(21) Appl. No.: 11/676,851

(22) Filed: Feb. 20, 2007

(65) Prior Publication Data

US 2007/0195458 A1  Aug. 23, 2007

(30) Foreign Application Priority Data

Feb. 23, 2006  (JP) .................................. 2006-046826
Sep. 4, 2006   (JP) .................................. 2006-239411

(51) Int. Cl.
    *G06K 19/06* (2006.01)
(52) U.S. Cl. ..................................................... 235/492
(58) Field of Classification Search ................... 235/492
    See application file for complete search history.

(56) References Cited

U.S. PATENT DOCUMENTS 6,285,557 B1 *  9/2001  Tomioka et al. ............. 361/754
6,332,578 B1 * 12/2001  Niwata et al. ................ 235/486
2002/0008142 A1 *  1/2002  Takayasu et al. ............. 235/441
2002/0009911 A1 *  1/2002  Uchikawa ..................... 439/159
2007/0295819 A1 * 12/2007  Bertsch ......................... 235/480

FOREIGN PATENT DOCUMENTS

| JP | 01-214490  | 8/1989 |
| JP | 7-210646   | 8/1995 |
| JP | 10-232908  | 9/1998 |
| JP | 2002-133377 | 5/2002 |

* cited by examiner

*Primary Examiner* — Steven S Paik
*Assistant Examiner* — Tae Kim
(74) *Attorney, Agent, or Firm* — Oblon, Spivak, McClelland, Maier & Neustadt, L.L.P.

(57) ABSTRACT

An apparatus for holding a recording medium that contains an engagement member backwards with respect to an insert direction thereof has a main body containing an insert portion through which the recording medium is inserted on one end thereof and an eject portion on the other end thereof. The inserted recording medium are ejected from the eject portion with it being linked with an insert of the recording medium from the insert portion. The apparatus has a first engagement device that engages the engagement member of the recording medium when the recording medium is inserted by a predetermined position to hold the inserted recording medium. The apparatus has a second engagement device that engages the engagement member of the recording medium when the recording medium is ejected from the ejection portion to hold the ejected recording medium.

7 Claims, 12 Drawing Sheets

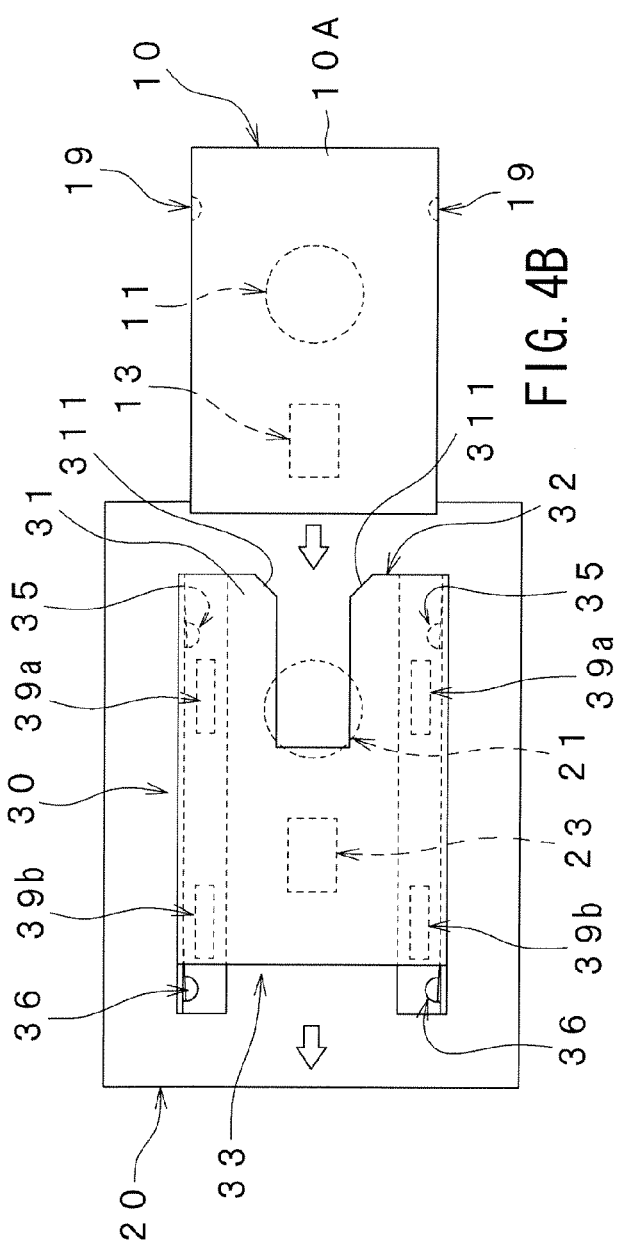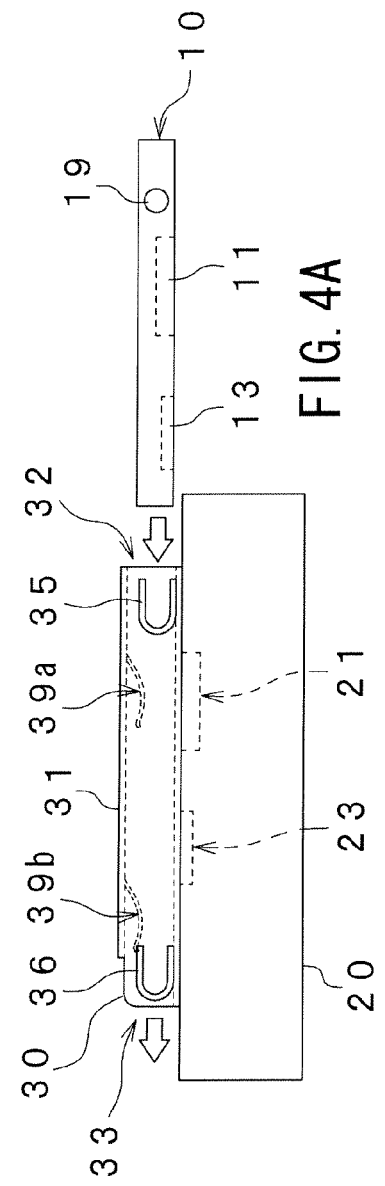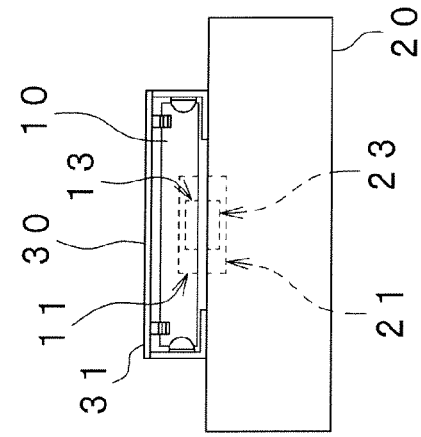

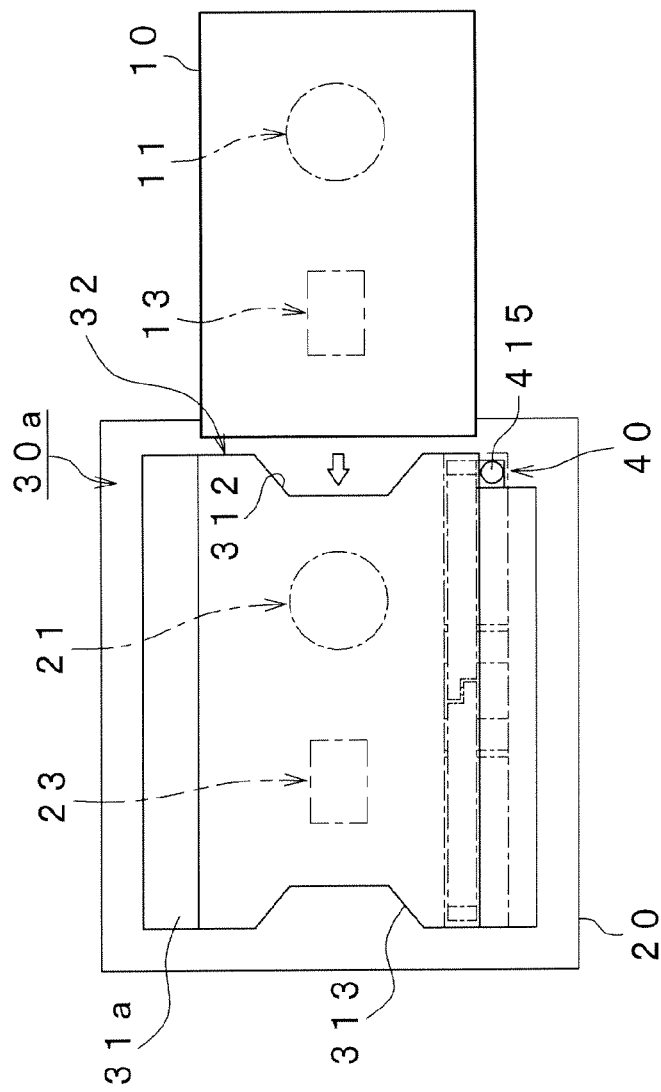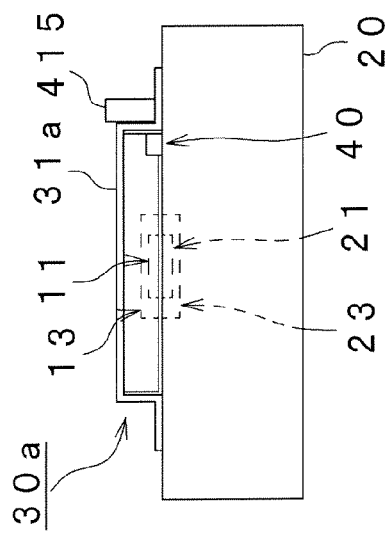

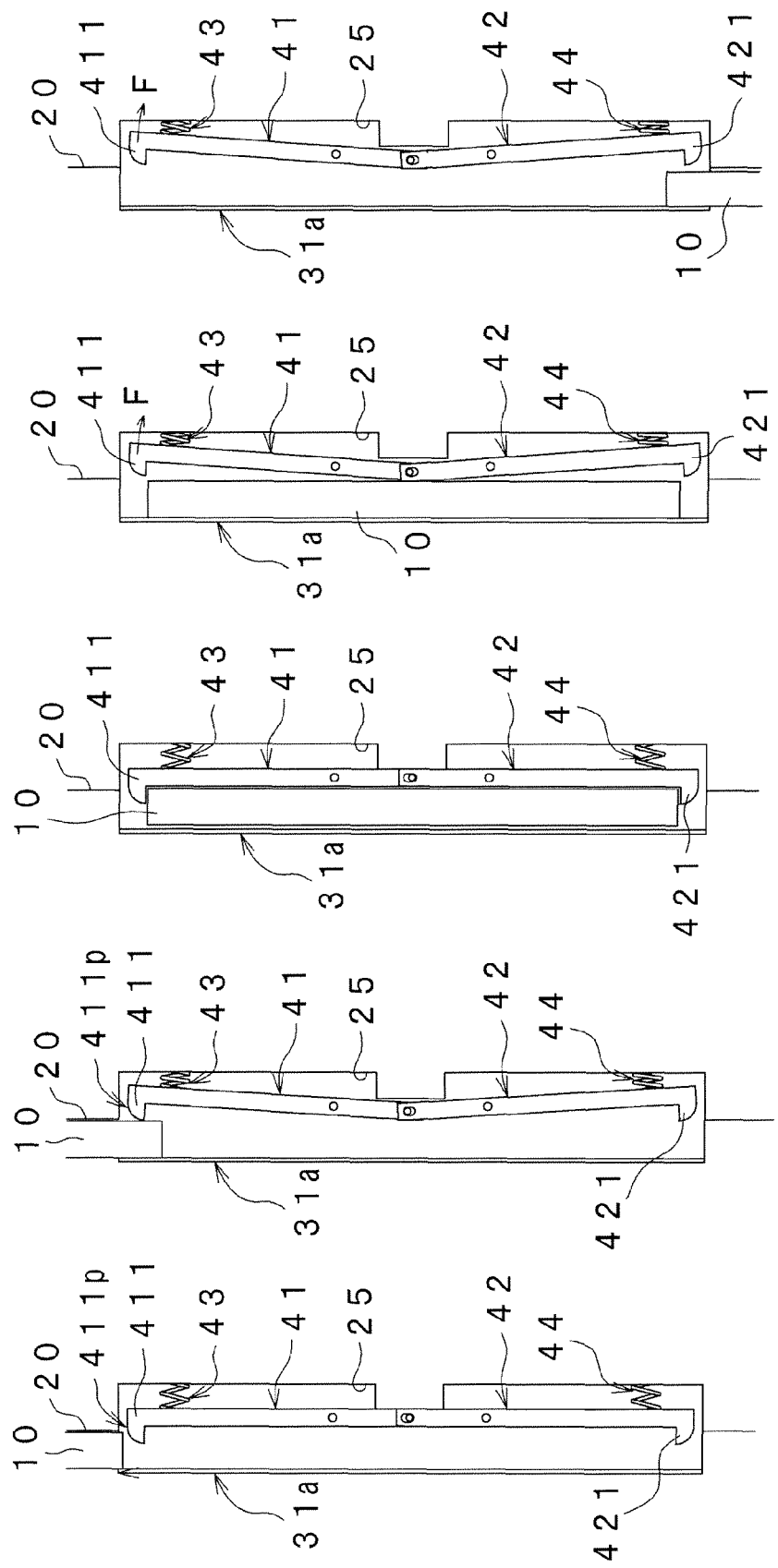

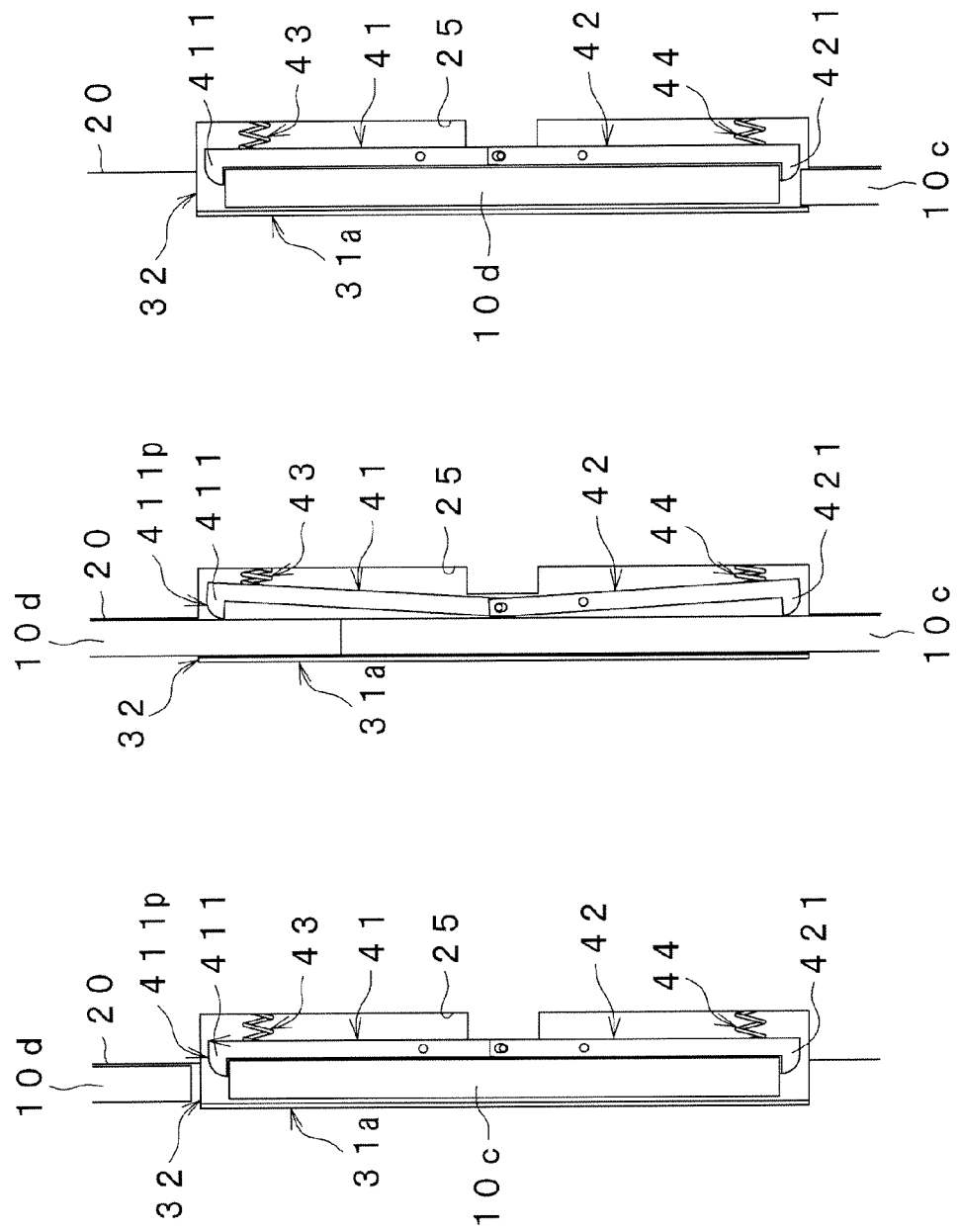

RECORDING MEDIUM AND APPARATUS FOR HOLDING THE SAME

CROSS REFERENCE TO RELATED APPLICATION

The present invention contains subject matter related to Japanese Patent Applications JP 2006-046826 and JP 2006-239411 filed in the Japanese Patent Office on Feb. 23, 2006 and Sep. 4, 2006, respectively, the entire contents of which being incorporated herein by reference.

BACKGROUND OF THE INVENTION

1. Field of the Invention

The present invention relates to a recording medium such as an integrated circuit (IC) card and an apparatus for holding the same.

2. Description of Related Art

In the past, a memory card that is constituted of a portable contact-type recording medium such as a semiconductor memory, which is available for reading and/or writing data, and has contact point(s) for transmitting a signal and/or for supplying power has written or read the data by using a slot-type reader/writer. The slot-type reader/writer has an insert portion for inserting the memory card thereinto and contact point(s). When the memory card is inserted into the reader/writer through the insert portion, the contact point $8s$) of the reader/writer is (are) contacted to contact point(s) of the memory card so that the data can be read and/or written therethrough.

Alternatively, Japanese Patent Application Publication No. 2004-288202 has disclosed that an ejection mechanism for ejecting the inserted memory card easily. The ejection mechanism disclosed in Japanese Patent Application Publication No. 2004-288202 is configured so that when sliding an ejection knob, an ejection hook pushes against a grooved ejection surface of the memory card, thereby enabling the memory card to be ejected.

SUMMARY OF THE INVENTION

However, as the above-mentioned portable recording medium, in addition to the contact-type recording medium such as a memory card having any contact points as described above, a contactless recording medium such as an IC card having no contact point has been used. Since such the contactless recording medium has no contact point, it is not necessary to connect the contact point(s) of the contactless recording medium to that (those) of the reader/writer by means of inserting the contactless recording medium into the reader/writer through the insert portion thereof or to disconnect the contact point(s) of the contactless recording medium from that (those) of the reader/writer by means of ejecting the inserted contactless recording medium from the reader/writer through the insert portion therefor.

In, however, the past reader/writer having such a configuration that the recording medium can be inserted into or ejected from the reader/writer through the insert portion, when the recording media are exchanged, it is necessary for a new recording medium to be inserted into the reader/writer after the recording medium already inserted into the reader/writer through the insert portion has been ejected. This causes an extended period of time for exchanging the recording media to be taken. Accordingly, if an image imaged by a video camera is recorded on a recording medium when the extended period of time for exchanging the recording media is taken, a user may fail to image any desired scene. Further, if any mechanism for insert or eject the recording medium is provided in order to allow the recording medium to be easily inserted thereinto or ejected therefrom, this causes the costs therefor to be increased.

It is thus desirable to provide a recording medium and an apparatus for holding the same in which recording media can be easily exchanged.

According to an embodiment of the invention, there is provided an apparatus for holding a recording medium that contains an engagement member backwards with respect to an insert direction thereof. The apparatus has a main body containing an insert portion through which the recording medium is inserted thereinto on one end thereof and an eject portion therefrom on the other end thereof. The inserted recording medium is ejected from the main body through the eject portion with it being linked with an insert of a recording medium from the insert portion. The apparatus also has a first engagement device, provided in the main body, which engages the engagement member of the recording medium when the recording medium is inserted by a previously set position, for example, a position in the main body, where the recording medium enables data to be transmitted to the reader/writer to read and write the data therefrom and thereinto, to hold the inserted recording medium. The apparatus further has a second engagement device, provided in the main body on its ejection portion side, which engages the engagement member of the ejected recording medium when a new recording medium is inserted by a previously set position and the inserted recording medium is ejected from the main body through the ejection portion to hold the ejected recording medium.

According to another embodiment of the invention, there is provided an apparatus for holding a recording medium. The apparatus has a main body, a catching device containing a catching member that catches the recording medium at its end when the recording medium is inserted into the main body by a previously set position thereof, and an urging member that urges the catching device to set the catching member to its first position for catching the recording medium. The catching member has an attaching surface that attaches a forward end of the recording medium when the recording medium is inserted. The attaching surface has a configuration to allow the inserting recording medium to be slid. When the recording medium is inserted and the recording medium is slid on the attaching surface, the catching member is set to its second position for releasing the recording medium from the caught posture thereof by a force against an urge by the urging member. When the recording medium is inserted into the main body by the previously set position thereof, the recording medium slides and passes through the catching member having the attaching surface to allow the catching member to be reset to its first position by the urging member.

According to further embodiment of the invention, there is provided a recording medium including a case, a storage portion that stores data, a medium control portion that controls the recording medium to read and write the data from and into the storage portion, a signal transmission portion that transmits a signal to communicate, a signal-transmission-processing portion that performs processing to process a signal received by the signal transmission portion and acquire the data to be written into the storage portion and that generates a signal to be transmitted from the signal transmission portion based on the data read out of the storage portion, a power transmission portion that generates power and transmits the power, and a power-supplying portion that supplies the power generated by and received from the power transmission portion. The case contains the storage portion, the control portion, the signal transmission portion, the signal-transmission-processing portion, the power transmission portion, and the power-supplying portion. The case contains an engagement member that is engaged with the engagement member of an apparatus for holding the recording medium when the recording medium is inserted into the apparatus by a position where the signal transmission portion transmits a signal to communicate and the power transmission portion transmits the power.

Thus, in the above embodiments of the invention, when the recording medium containing an engagement member backwards with respect to an insert direction thereof is inserted into the main body of the apparatus for holding the recording medium through the insert portion thereof, the inserted recording medium is ejected from the eject portion of the main body with it being linked with an insert of the recording medium from the insert portion. When the recording medium is then inserted by a previously set position in the main body, the first engagement device provided in the main body engages the engagement member of the recording medium to hold the inserted recording medium. Further, the second engagement device provided in the main body on an ejection portion side of the main body engages the engagement member of the recording medium pushed out of the eject portion to hold the ejected recording medium. Additionally, when the recording medium is inserted into the main body by a previously set position thereof, catching member catches the recording medium at its end, for example, forward and rear ends of the recording medium at its ends, to hold the recording medium.

According to the above embodiments of the invention, by solely inserting the new recording medium into the apparatus for holding the recording medium through the insert portion, it is possible to exchange the recording media, thereby shortening a period of time for necessary for exchanging the recording media. If imaging equipment is provided with the apparatus for holding the recording medium, this enables the user thereof to avoid failing to image a desired scene. When the inserted recording medium is ejected from the eject portion, the second engagement device of the main body engages the engagement member of the recording medium pushed out of the eject portion to hold the ejected recording medium, so that any damage by dropping down or loss of the ejected recording medium occurred when exchanging the recording media can be decreased. Such the apparatus for holding recording medium has a simple configuration, which may be made at a low price. When catching member catches the recording medium to hold it, it can be hard to generate dropping down or the like of the held recording medium, thereby enabling the recording medium to be surely held.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 3A is a perspective view thereof and FIG. 3B is a schematic cross-sectional view thereof taken along the lines IIIB-IIIB shown in FIG. 3A;

FIGS. 4A, 4B and 4C are diagrams for illustrating a case where the contactless recording medium is inserted into an apparatus for holding the contactless recording medium according to another embodiment of the present invention, FIG. 4A is a front view thereof, FIG. 4B is a plane view thereof, and FIG. 4C is a left side view thereof;

FIGS. 6A and 6B are diagrams each for illustrating a configuration of an apparatus for holding the contactless recording medium according to further embodiment of the present invention, FIG. 6A is a front view thereof and FIG. 6B is a plane view thereof;

FIG. 8A is a plane view thereof and FIG. 8B is a schematic cross-sectional view thereof taken along the lines VIIIB-VIIIB shown in FIG. 8A;

FIGS. 9A through 9E are diagrams each for illustrating an insert operation of the contactless recording medium;

FIGS. 10A, 10B, and 10C are diagrams each for illustrating an exchange operation of the contactless recording media;

DESCRIPTION OF THE PREFERRED EMBODIMENTS

Figure 1:
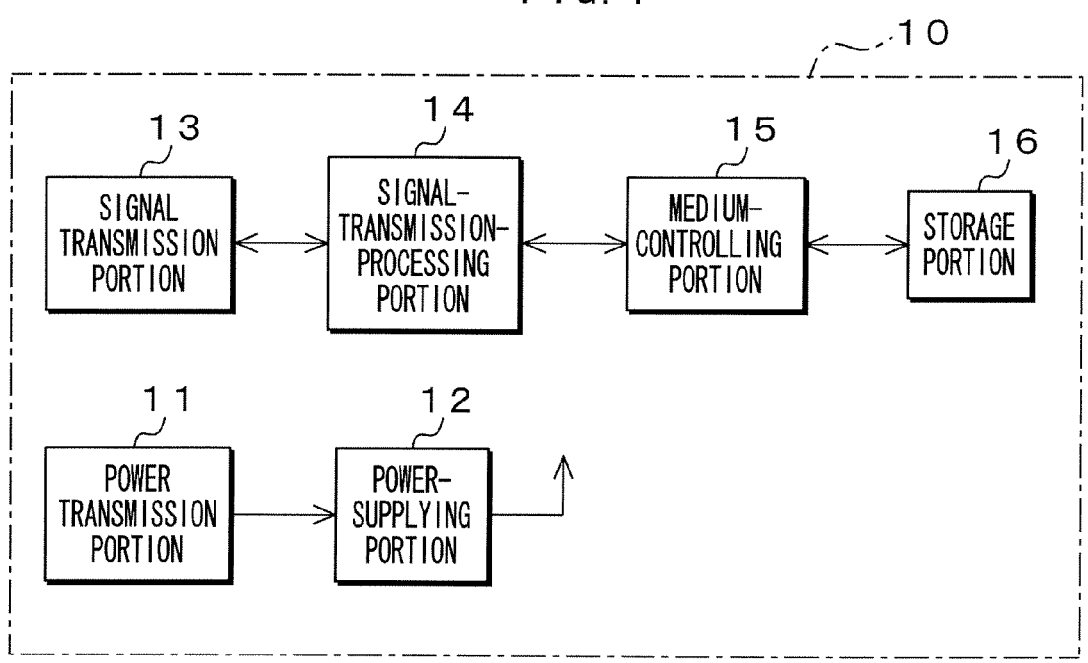
FIG. 1 is a block diagram for showing a configuration of a contactless recording medium according to an embodiment of the present invention.

The following will describe preferred embodiments of a contactless recording medium and an apparatus for holding the same in accordance with the present invention with reference to the accompanying drawings. FIG. 1 shows a configuration of an embodiment of a contactless recording medium 10 according to the present invention, which is held in an embodiment of the apparatus for holding the contactless recording medium in accordance with the present invention.

The contactless recording medium 10 has a power transmission portion 11 that receives power by non-contact transmission of power from a reader/writer, not shown, and a signal transmission portion 13 that transmits a signal to read and/or write data from and/or into the reader/writer under their contactless situation. The reader/writer also contains a power transmission portion having the same configuration as the power transmission portion 11 and a signal transmission portion having the same configuration as the signal transmission portion 13.

Figure 2A:
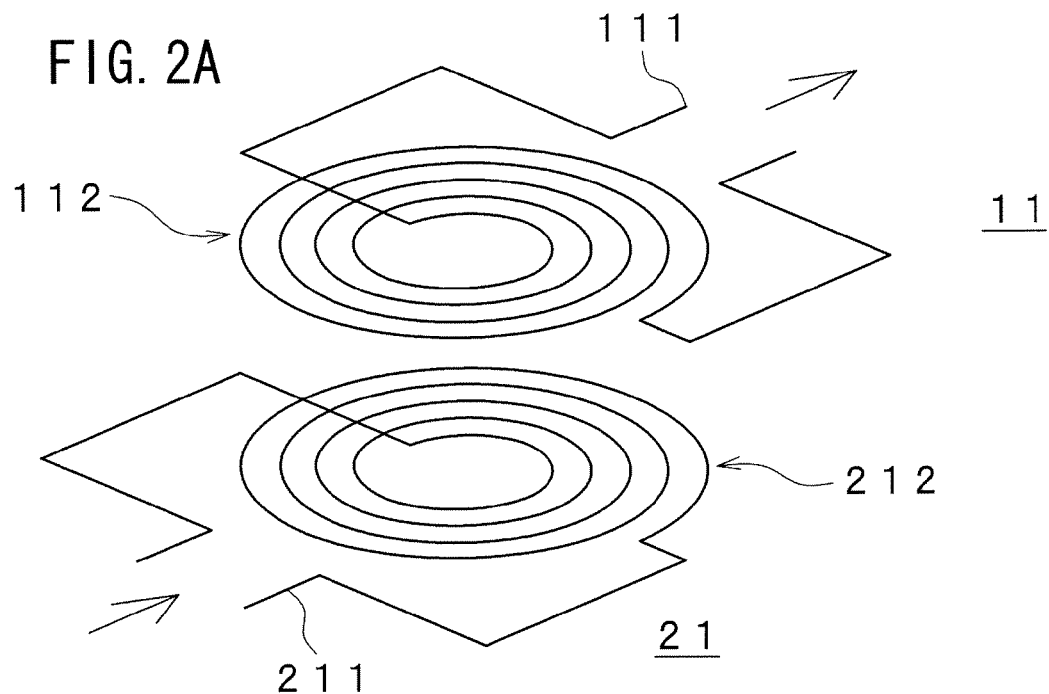
FIGS. 2A and 2B are diagrams each for showing a configuration of a power transmission portion shown in FIG. 1.

FIG. 2 shows a configuration of the power transmission portion 11 that is used for the non-contact transmission of power. As shown in FIG. 2A, the power transmission portion 11 of the contactless recording medium 10 is configured so that an insulated single wire 111 is wound as an eddy on the same plane to form a flat coil 112. Similar to the power transmission portion 11, the power transmission portion 21 of the reader/writer is configured so that an insulated single wire 211 is wound as the eddy on the same plane to form a flat coil 212.

Figure 2B:
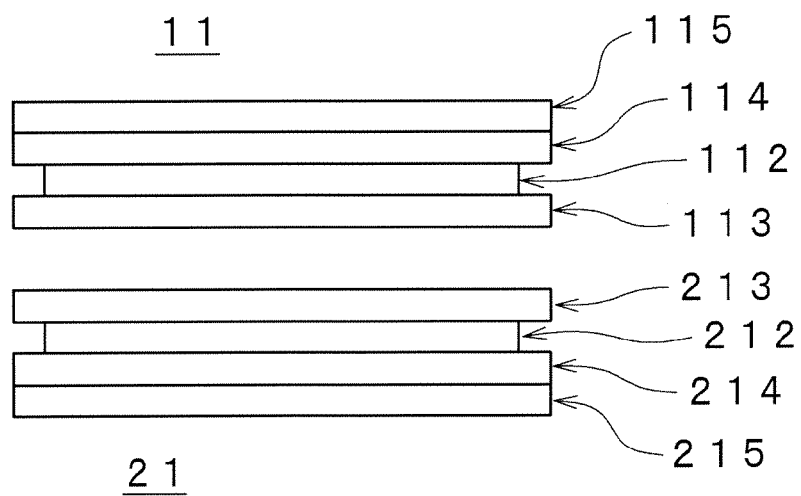

As shown in FIG. 2B, the flat coil 112 is sandwiched between insulation sheets 113, 114. A metal sheet 115 is set on a surface of the insulation sheet 114, which is opposite to a surface of the insulation sheet 114 facing the reader/writer. This prevents a leakage flux therefrom. Similarly, the flat coil 212 is sandwiched between insulation sheets 213, 214. A metal sheet 215 is set under a surface of the insulation sheet 214, which is opposite to a surface of the insulation sheet 214 facing the contactless recording medium 10. This also prevents a leakage flux therefrom.

If an alternating current is flown through terminals of the flat coil 212 of the power transmission portion 21 to generate an alternating magnetic field, the power transmission portions 11, 21 are electromagnetically coupled so that an induced voltage occurs between terminals of the flat coil 112 of the power transmission portion 11. Such the induced voltage is supplied to a power-supplying portion 12 shown in FIG. 1.

The power-supplying portion 12 receives the induced voltage generated by the electromagnetic coupling of the power transmission portions 11, 21 and performs rectification and/or smoothing on it to obtain direct current (DC) voltage. The power-supplying portion 12 then supplies the obtained DC voltage to each part of the contactless recording medium 10.

Although each of the insulated single wires 111, 211 has been wound as an eddy on the same plane to form the flat coils 112, 212, respectively, shown in FIG. 2A, an eddy pattern can be illustratively formed on a substrate to form the flat coil. This allows such the flat coil that has a large number of windings to be easily made in a low price.

A signal is transmitted between the contactless recording medium and the reader/writer at a higher frequency band than that used for non-contact transmission of power, in order to read and/or write data at a high speed. If data is read and/or written with the contactless recording medium and the reader/writer being come close to each other, the data can be transmitted by utilizing interwire coupling capacitance, not transmitting and/or receiving any electric wave.

Figure 3A:
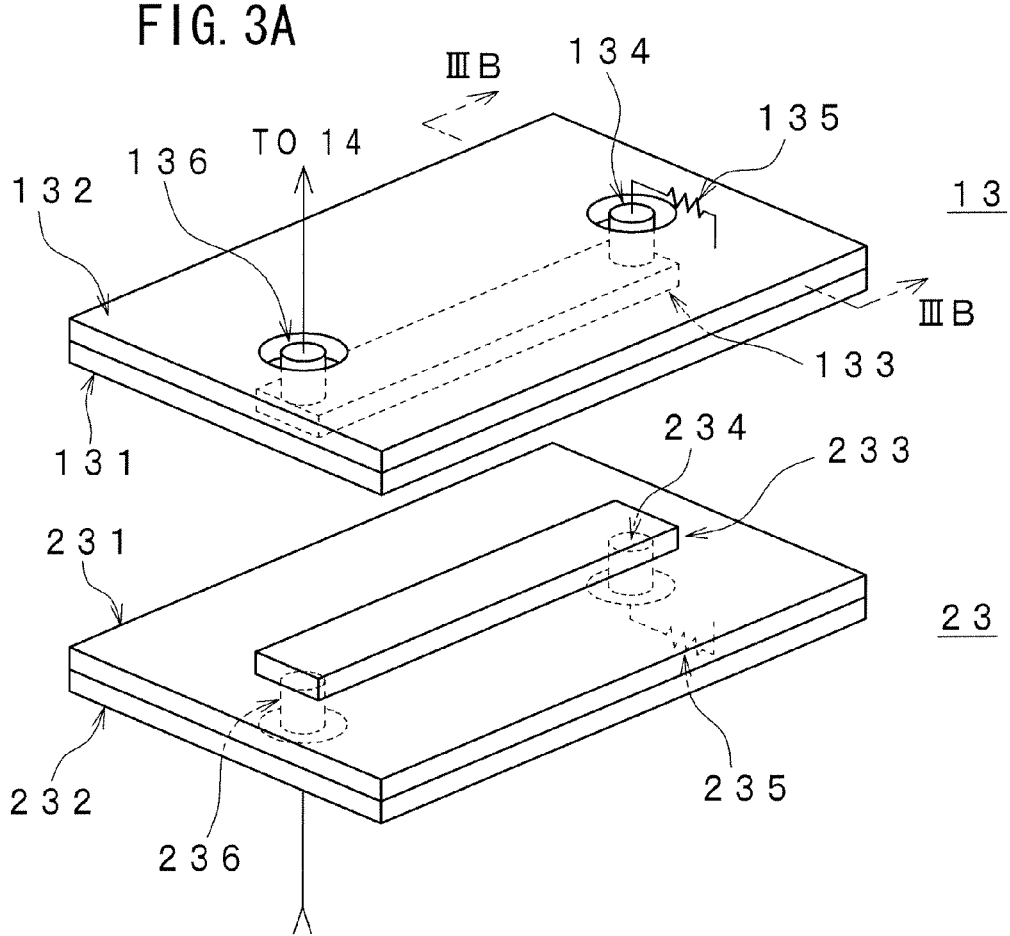
FIGS. 3A and 3B are diagrams each for illustrating a configuration of a signal transmission portion shown in FIG. 1.
Figure 3B:
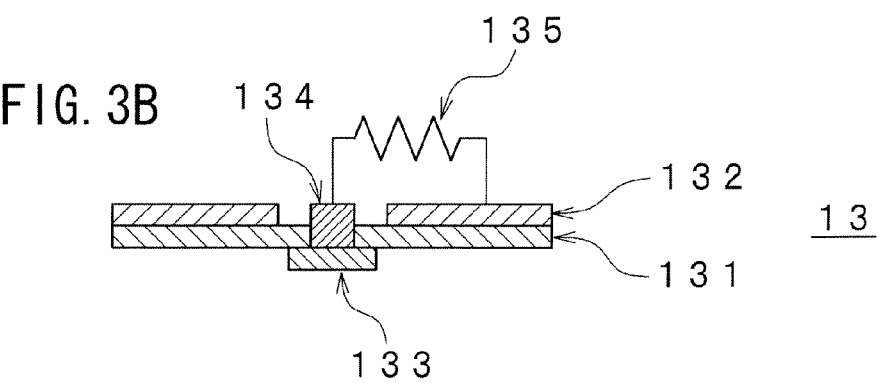

FIG. 3 illustrates a configuration of the signal transmission portion that transmits a signal by utilizing any interwire coupling capacitance to transmit data. It is to be noted that FIG. 3B is a schematic cross-sectional view thereof taken along the lines IIIB-IIIB shown in FIG. 3A.

The signal transmission portion 13 of the contactless recording medium 10 has a microstrip line such that a dielectric substrate 131 can have a ground pattern 132 on one surface thereof and a signal pattern 133 on the other surface thereof, as shown in FIG. 3A. One terminal of the signal pattern 133 is grounded through a via hole 134 piercing through the dielectric substrate 131 and a terminating resistance 135. The other terminal of the signal pattern 133 is connected to a signal-transmission-processing portion 14 shown in FIG. 1 through a via hole 136 piercing through the dielectric substrate 131.

Similar to the signal transmission portion 13 of the contactless recording medium 10, the reader/writer 20 (see FIGS. 4A through 4C) also has a signal transmission portion 23. The signal transmission portion 23 also has a microstrip line such that a dielectric substrate 231 can have a ground pattern 232 on one surface thereof and a signal pattern 233 on the other surface thereof. One terminal of the signal pattern 233 is grounded through a via hole 234 piercing through the dielectric substrate 231 and a terminating resistance 235. The other terminal of the signal pattern 233 is connected to a signal-transmission-processing portion, not shown, of the reader/writer 20 through a via hole 236 piercing through the dielectric substrate 231.

If the data is read or written from or into the contactless recording medium 10, in order to make it possible to generate the interwire coupling between the signal pattern 133 and the signal pattern 233, the contactless recording medium 10 and the reader/writer 20 are come closer to each other.

If the signal-transmission-processing portion of the reader/writer 20 supplies the signal transmission portion 23 thereof with a high frequency signal, any interwire coupling occurs between the signal pattern 133 of the contactless recording medium 10 and the signal pattern 233 so that the signal-transmission-processing portion 14 of the contactless recording medium 10 can be supplied with the high frequency signal output from the signal-transmission-processing portion of the reader/writer 20. Further, if the signal-transmission-processing portion 14 supplies the signal transmission portion 13 with a high frequency signal, any interwire coupling also occurs so that the signal transmission portion 23 of the reader/writer 20 can be supplied with the high frequency signal output from the signal-transmission-processing portion 14 of the contactless recording medium 10.

The signal-transmission-processing portion 14 shown in FIG. 1 restores the high frequency signal received from the signal transmission portion 13 to a former signal that is a signal before the signal-transmission-processing portion of the reader/writer 20 has been processed on it and supplies a medium-controlling portion 15 shown in FIG. 1 with the restored signal. The signal-transmission-processing portion 14 also converts a signal received from the medium-controlling portion 15 to a high frequency signal to be transmitted and supplies the signal transmission portion 13 with the converted high frequency signal.

The medium-controlling portion 15 determines which is instructed by the reader/writer 20 based on the signal received from the signal-transmission-processing portion 14 and performs any processing on the basis of the determined result. For example, when it is determined that the reader/writer 20 requests writing, the medium-controlling portion 15 allows a storage portion 16 shown in FIG. 1 to store the data received from the reader/writer 20. When it is also determined that the reader/writer 20 requests reading, the medium-controlling portion 15 reads out of the storage portion 16 the data requested by the reader/writer 20 and supplies the signal-transmission-processing portion 14 with it as a signal having a predetermined format.

In the contactless recording medium 10 thus configured, a closed case 10A includes the power transmission portion 11, the power-supplying portion 12, the signal transmission portion 13, the signal-transmission-processing portion 14, the medium-controlling portion 15, and the storage portion 16 with them being unified. The power transmission portion 11 and the signal transmission portion 13 are positioned at a side, which is come closer to the reader/writer 20, inside the case 10A to enable the power transmission and/or the signal transmission to be efficiently carried out. Thus, the contactless recording medium 10 has no contact point so that no contact fault by any adhered dust to the contact point can occur and any damage of internal circuit of the contactless recording medium 10 by static electricity from one's body may be sufficiently prevented. This allows the contactless recording medium 10 to keep any excellent reliability.

FIGS. 4A through 4C illustrate a case where the contactless recording medium is inserted into an apparatus 30 for holding the contactless recording medium 10 (hereinafter, referred to as "holding apparatus 30"). It is to be noted that FIG. 4A is a front view thereof, FIG. 4B is a plane view thereof, and FIG. 4C is a left side view thereof. The contactless recording medium 10 is inserted into a main body 31 of the holding apparatus 30 through an insert portion 32 of the main body 31 with its side to which the power transmission portion 11 and the signal transmission portion 13 are provided facing the reader/writer 20. The holding apparatus 30 is mounted on the reader/writer 20. The inserted contactless recording medium 10 is ejected from an eject portion 33 that is provided at an opposite side of the main body 31 to the insert portion 32.

The case 10A of the contactless recording medium 10 contains an engagement member that can be engaged with the engagement member of the holding apparatus 30 at its rear portion with respect to its insert direction so that the contactless recording medium 10 can be held at its locating posture. For example, as the engagement member, the case 10A of the contactless recording medium 10 contains recesses 19, 19 on the both sides of the case 10A.

The main body 31 of the holding apparatus 30 is provided in both inner sides thereof with first engagement devices that engage the engagement member of the contactless recording medium 10 when the contactless recording medium 10 is inserted into the holding apparatus 30 by a position to hold the inserted contactless recording medium 10 so that the power transmission portion 11 of the contactless recording medium 10 can face the power transmission portion 21 of the reader/writer 20 and the signal transmission portion 13 of the contactless recording medium 10 can face the signal transmission portion 23 of the reader/writer 20, respectively. For example, the main body 31 of the holding apparatus 30 is provided in both inner sides thereof with projecting devices 35, 35 that engage the recesses 19, 19 of the contactless recording medium 10, respectively.

These projecting devices 35, 35 may be pushed outwardly when inserting the contactless recording medium 10 and if it is pushed outwardly, it can be returned to its original position by its urging force. For example, parts of the main body 31 are cut as U-shape around the projecting devices 35, 35 to form an elastic member. The projecting devices 35, 35 may include any elastic member such as a plate spring so that they are respectively contacted onto the main body 31 of the holding apparatus 30 through the elastic member.

The recesses 19, 19 and the projecting devices 35, 35 respectively have any corresponding engagement surfaces that can be released from their engagement conditions by pushing the projecting devices 35, 35 outwardly when force exceeding any predetermined one is applied to the inserted contactless recording medium 10 toward its insert direction. For example, the recesses 19, 19 and the projecting devices 35, 35 respectively have corresponding engagement hemispherical surfaces as shown in FIG. 4B. Further, they can have respectively the corresponding engagement half column side surfaces.

If the recesses 19, 19 and the projecting devices 35, 35 are respectively configured as the above when the contactless recording medium 10 is inserted into the main body 31 of the holding apparatus 30 through the insert portion 32 of the main body 31, the recesses 19, 19 and the projecting devices 35, 35 are respectively contacted with each other to position and hold the contactless recording medium 10 so that the contactless recording medium 10 can transmit power and/or signal efficiently.

The main body 31 of the holding apparatus 30 is also provided in both inner sides thereof near the eject portion 33 with second engagement devices that engage the engagement member of the ejected contactless recording medium 10 when a new contactless recording medium 10 is inserted into the main body 31 of the holding apparatus 30 to eject the inserted contactless recording medium 10 out of the eject portion 33 of the main body 31 so that an engagement member of the newly inserted contactless recording medium 10 is engaged with the first engagement device of the holding apparatus 30. Namely, the main body 31 of the holding apparatus 30 is provided in both inner sides thereof near the eject portion 33 with the projecting devices 36, 36 to engage the projecting devices 36, 36 with the recesses 19, 19 of the ejected contactless recording medium 10 when the recesses 19, 19 of the newly inserted contactless recording medium 10 are respectively engaged with the projecting devices 35, 35 of the holding apparatus 30. These projecting devices 36 have the same configurations as those of the projecting devices 35, 35 and may be pushed outwardly by the ejected contactless recording medium 10. If they are pushed outwardly, they can be returned to their original positions by their urging force.

Such the projecting devices 36, 36 allows the ejected contactless recording medium 10 to be hold so as to prevent it from dropping down since the recesses 19, 19 of the ejected contactless recording medium 10 are engaged with the projecting devices 36, 36 provided near the eject portion 33 of the main body 31 of the holding apparatus 30 when a new contactless recording medium 10 is inserted into the main body 31 of the holding apparatus 30 to eject the inserted contactless recording medium 10 out of the eject portion 33 of the main body 31 so that the recesses 19, 19 of the newly inserted contactless recording medium 10 are engaged with the projecting devices 35, 35 of the holding apparatus 30.

Pushing members 39a, 39b that push the contactless recording medium 10 against the reader/writer 20 are provided inside the main body 31 of the holding apparatus 30. Thus, providing the pushing members 39a, 39b enables the contactless recording medium 10 to be held so that the contactless recording medium 10 can keep a distance between the contactless recording medium 10 and the reader/writer 20 minimum and stay still, thereby allowing a stabilized transmission path to be established. This enables the power transmission and/or the signal transmission to be efficiently carried out. This also prevents the inserted contactless recording medium 10 from wobbling.

If the pushing members 39a, 39a are respectively provided near the projecting devices 35, 35, this prevents the recesses 19, 19 of the inserted contactless recording medium 10 from being greatly deviated upwardly against a pushing direction (downward direction in FIG. 4A) of the pushing members 39a, 39a, so that if the recesses 19, 19 and the projecting devices 35, 35 respectively have the corresponding engagement hemispherical surfaces, the recesses 19, 19 and the projecting devices 35, 35 can be surely engaged with each other when the contactless recording medium 10 is inserted into the main body 31 of the holding apparatus 30 by a previously set position.

If the pushing members 39b, 39b are respectively provided so that they can push both of a forward end of the newly inserted contactless recording medium 10 when it is inserted thereinto by the previously set position and a rear end of the ejected contactless recording medium 10, the pushing members 39b, 39b can push the newly inserted contactless recording medium 10 against the reader/writer 20 and can also hold the ejected contactless recording medium 10 in a stable manner.

It is to be noted that if there are cut portions 311, 311 on the insert portion 32 of the main body 31 of the holding apparatus 30, a user can eject the inserted contactless recording medium 10 with his or her finger(s) by utilizing these cut portions 311, 311, without inserting any new contactless recording medium.

The following will describe insert and exchange operations of the contactless recording medium with reference to FIGS. 5A through 5E. It is to be noted that in FIGS. 5A through 5E, the holding apparatus 30 is shown along its section in order to make the operations thereof easily understood.

Figure 5A:
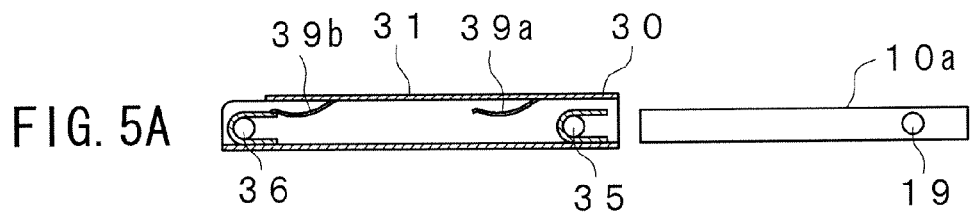
FIGS. 5A through 5E are diagrams for illustrating an insert operation of the contactless recording medium and an exchange operation of the contactless recording media.

As shown in FIG. 5A, a user inserts a contactless recording medium 10a containing an engagement member, the recesses 19, 19, backwards with respect to an insert direction thereof into the main body 31 of the holding apparatus 30 through the insert portion 32 thereof. The pushing members 39a, 39a push the inserted contactless recording medium 10a against the reader/writer 20.

Figure 5B:
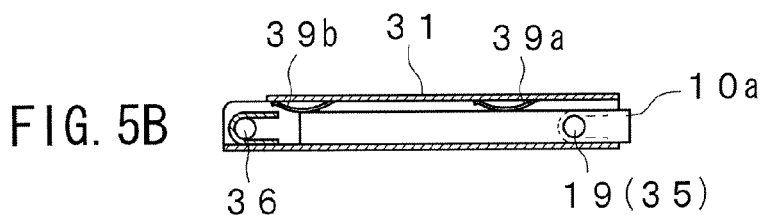

As shown in FIG. 5B, when the inserted contactless recording medium 10a reaches a previously set position, namely, a position of the main body 31 where the inserted contactless recording medium 10a can transmit and/or receive the signal and/or power to and/or from the reader/writer 20 that reads and/or writes the data from and/or to the contactless recording medium 10a, the recesses 19, 19 of the inserted contactless recording medium 10a are engaged with the projecting devices 35, 35 of the holding apparatus 30, thereby enabling the inserted contactless recording medium 10a to be held.

Figure 5C:
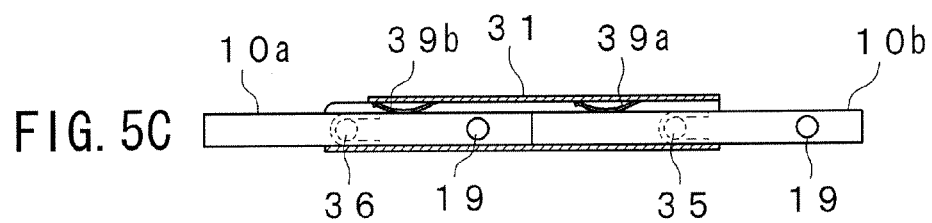

When exchanging the inserted contactless recording medium 10a, the user inserts a new contactless recording medium 10b into the main body 31 of the holding apparatus 30 through the insert portion 32 thereof, as shown in FIG. 5C. This enables the inserted contactless recording medium 10a to be ejected from the eject portion 33 of the main body 31 thereof.

Figure 5D:
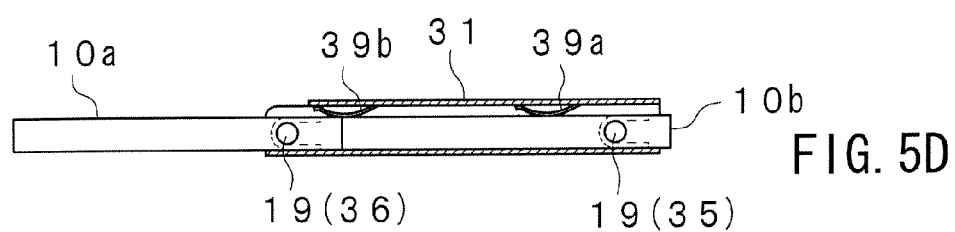

When the newly inserted contactless recording medium 10b then reaches the previously set position shown in FIG. 5D, the recesses 19, 19 of the newly inserted contactless recording medium 10b are engaged with the projecting devices 35, 35 of the holding apparatus 30, thereby enabling the newly inserted contactless recording medium 10b to be held at the previously set position. At the same time, the recesses 19, 19 of the inserted contactless recording medium 10a are engaged with the projecting devices 36, 36 of the main body 31 of the holding apparatus 30. This enables the contactless recording medium 10a that has been ejected from the eject portion 33 of the main body 31 thereof to be held to prevent the ejected contactless recording medium 10a from dropping down.

Figure 5E:
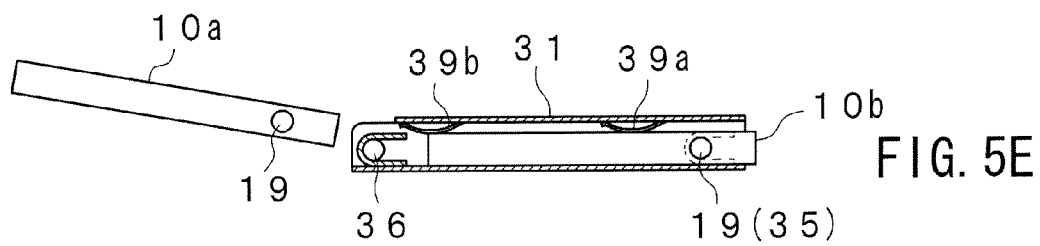

As shown in FIG. 5E, the user then can pull the contactless recording medium 10a held near the eject portion 33 of the main body 31 thereof, thereby enabling the inserted contactless recording medium 10a to be detached from the holding apparatus 30.

Thus, it is possible to hold the contactless recording medium 10 at a position of the main body 31 where the inserted contactless recording medium 10a can transmit and/or receive the signal and/or the power to and/or from the reader/writer 20 by only inserting the new contactless recording medium into the main body 31 through the insert portion 32 thereof. Further, when exchanging the contactless recording media, this can be carried out by only inserting the new contactless recording medium into the main body 31 of the holding apparatus 30 through the insert portion 32 thereof. This enables the contactless recording medium to be rapidly and easily loaded or the contactless recording media to be rapidly and easily exchanged. Additionally, when ejecting the inserted contactless recording medium from the eject portion of the main body of the holding apparatus, the ejected contactless recording medium can be held by the holding apparatus. This prevents the ejected contactless recording medium from being damaged by dropping it down from the holding apparatus.

If the above-mentioned holding apparatus 30 is used for, for example, any portable electronic equipment, it is conceivable that the contactless recording medium 10 may be detached from the holding apparatus 30 when any force generated by shock gotten to the portable electronic equipment is applied to a position between the contactless recording medium 10 and the holding apparatus 30 along an insert direction of the contactless recording medium 10 and vice versa. As another embodiment of an apparatus for holding the contactless recording medium according to this invention, applicants provide an apparatus 30a for holding the contactless recording medium (hereinafter, referred to as "holding apparatus 10a), which can hold the contactless recording medium surely.

When the contactless recording medium 10 is inserted into the main body 31a of the holding apparatus 30a by a previously set position in the main body, the holding apparatus 30a surely catches the contactless recording medium 10 at its forward and rear ends by catches to hold the contactless recording medium 10 surely. The held contactless recording medium 10 is then released from the catching posture thereof by the catches, thereby enabling the contactless recording medium 10 to be detached.

Figure 7:
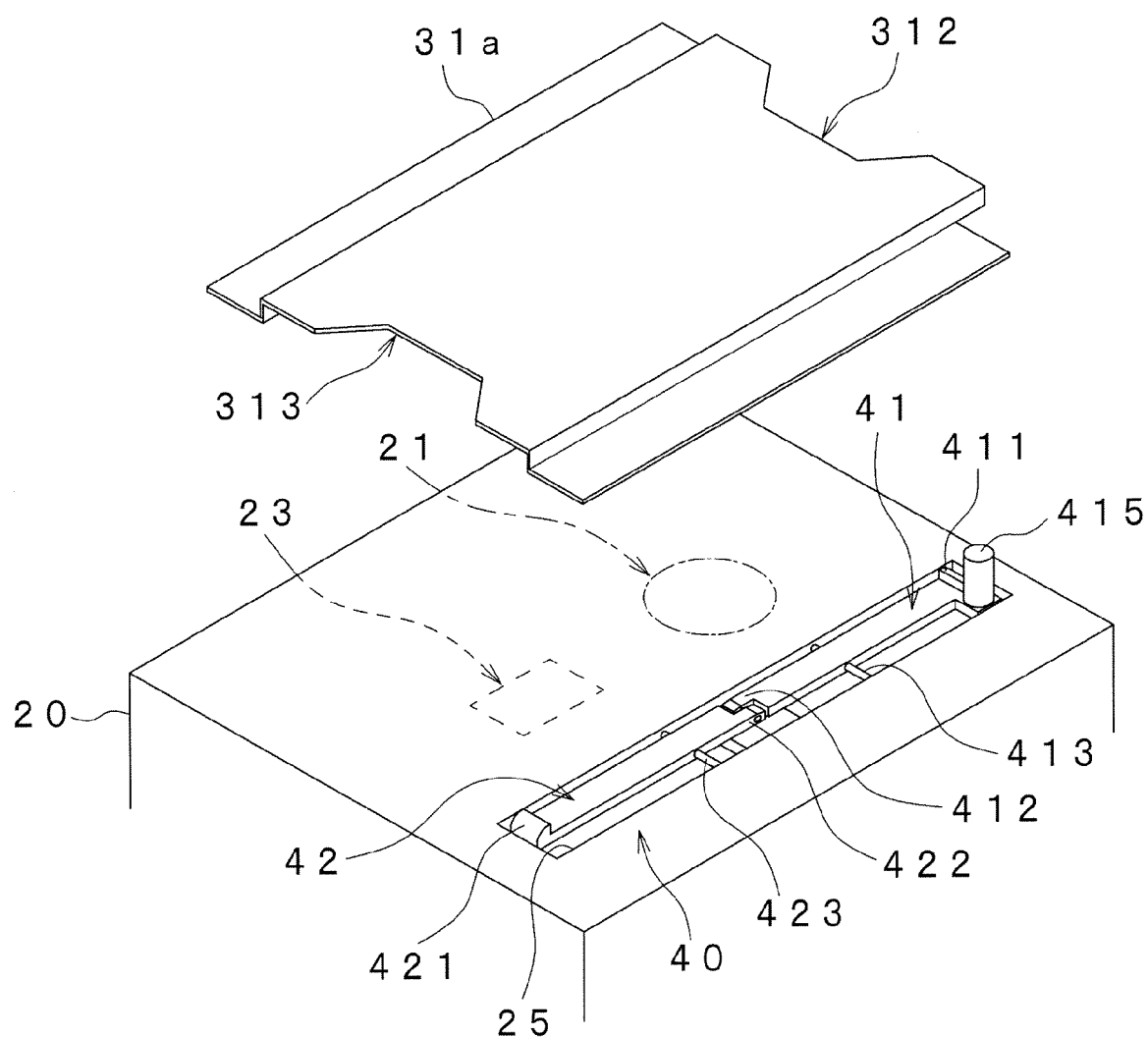
FIG. 7 is an exploded perspective view of the apparatus for holding the contactless recording medium shown in FIGS. 6A and 6B.
Figure 8A:
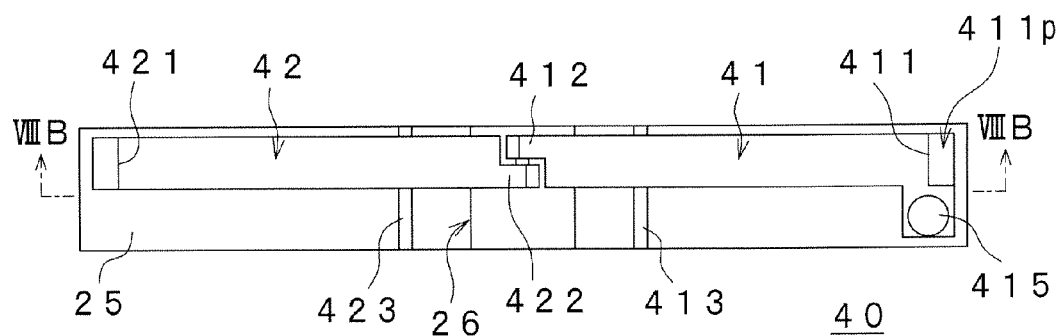
FIGS. 8A and 8B are diagrams each for showing a configuration of a catching device.
Figure 8B:
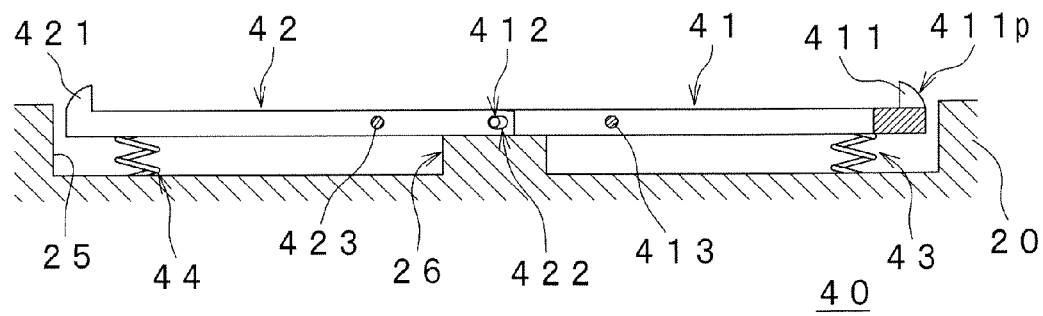

FIGS. 6A and 6B illustrate a configuration of the holding apparatus 30a according to further embodiment of the present invention. FIG. 7 is an exploded perspective view of the holding apparatus 30a shown in FIGS. 6A and 6B. FIGS. 8A and 8B show a configuration of a catching device 40. FIG. 8A is a front view thereof and FIG. 8B is a schematic cross-sectional view thereof taken along the lines VIIIB-VIIIB shown in FIG. 8A. In FIGS. 6A, 6B, and 7, like reference numbers refer to like elements corresponding to those shown in FIG. 4, detailed description of which will be omitted.

The contactless recording medium 10 is inserted into a main body 31a of the holding apparatus 30a, which is mounted on the reader/writer 20, through an insert portion 32 thereof with a side of the contactless recording medium 10, on which the power transmission portion 11 and the signal transmission portion 13 are provided, facing the reader/writer 20. The main body 31a mounted on the reader/writer 20 has the insert portion 32. The main body 31a also restricts any movement of the inserted contactless recording medium 10 so that the inserted contactless recording medium 10 can be aligned with the reader/writer 20 or can be prevented from moving away from the reader/writer 20. The main body 31a also has a cut portion 312 so that the contactless recording medium 10 that has been inserted into the main body 31a through the insert portion 32 thereof can be easily reached by a previously set position. It is to be noted that the main body 31a may have a cut portion 313 on a side thereof opposite to the insert portion 32 so that the contactless recording medium 10 can be inserted into the main body 31a of the holding apparatus 30a through the insert portion thereof opposite to the insert portion 32.

In the reader/writer 20, a cannel 25 is formed along an insert direction of the contactless recording medium 10 on a surface thereof facing the contactless recording medium 10.

A catching device 40 in the holding apparatus 30a has catches for catching the contactless recording medium 10 when the inserted contactless recording medium 10 is reached to the previously set position. This catching device 40 is installed and arranged in the channel 25 formed in the reader/writer 20.

The catching device 40 moves a first catch for catching a rear end of the contactless recording medium with respect to an insert direction thereof and a second catch for catching a forward end of the contactless recording medium with respect to an insert direction thereof to their first positions such that the contactless recording medium 10 can be caught by them when the inserted contactless recording medium 10 is reached to the previously set position. Alternatively, the catching device 40 moves the first catch and the second catch to their second positions such that the contactless recording medium 10 can be released from its caught posture when the held contactless recording medium 10 is detached to a new contactless recording medium or the held contactless recording media 10, 10 are exchanged.

In order to operate the first and second catches together to move them to their first or second positions, a first arm 41 and a second arm 42, for example, are linked in the catching device 40. The first arm 41 has a first catch 411 on its one end. The first arm 41 also has a jointing portion 412 on its other end. The second arm 42 has a second catch 421 on its one end. The second arm 42 also has a jointing portion 422 for jointing the jointing portion 412 of the first arm 41 on its other end.

The first arm 41 is set so that it can be swung around a shaft 413. Similarly, the second arm 42 is set so that it can be swung around a shaft 423. The first and second arms 41, 42 are jointed together by the jointing portions 412, 422 so that when any one of the first and second arms 41, 42 is swung, the other can be swung. The jointing portion 412 has a shaft extending toward the jointing portion 422. The jointing portion 422 has a through hole for allowing the shaft of the jointing portion 412 to be inserted thereinto. By inserting the shaft of the jointing portion 412 into the through hole in the jointing portion 422 to joint the first and second arms 41, 42 together, the first and second arms 41, 42 can be operated together.

An attaching surface 411*p* of the first catch 411, which attaches a forward end of the contactless recording medium 10 when the contactless recording medium 10 is inserted, has such a configuration as to allow the inserting contactless recording medium 10 to be slid thereon. For example, the attaching surface 411*p* has a configuration such as a slope or a curved surface. It is to be noted that FIGS. 7, and 8B shows the attaching surface 411*p* having a curved surface.

The holding apparatus 30*a* has an urging member that urges the catching device 40 to set the first and second catches 411, 421 to their first positions for catching the contactless recording medium 10. For example, the elastic members 43, 44 such as springs stand between the first arm 41 and a bottom of the channel 25 and between the second arm 42 and the bottom of the channel 25, respectively. Such the elastic members 43, 44 as the urging members causes the first and second arms 41, 42 to be projected exceeding a surface of the reader/writer 20, thereby enabling the catching device 40 to be set to the first position for catching the contactless recording medium 10.

On the other hands, if an excess amount of projection by the first catch 411 occurs, the forward end of the first arm 41 may be collided with the forward end of the contactless recording medium 10, so that no contactless recording medium 10 can be slid on the attaching surface 411*p* of the first catch 411 when the contactless recording medium 10 is inserted. Therefore, it is necessary for the first catch 411 to be limited to a previously set amount of projection thereof or less. For example, when the first catch 411 projects to a previously set amount of projection thereof, the first and second arms 41, 42 are come into contact with a stopper 26 provided inside the channel 25 to limit their swung behaviors. This allows an amount of projection of the first catch 411 to be limited, thereby enabling the inserting contactless recording medium 10 to be surely slid on the attaching surface 411*p* of the first catch 411. If in the second arm 42, distances between the shaft 423 and the second catch 421 and between the shaft 423 and the jointing portion 422 are set to the same ones as those in the first arm 41, the second catch 421 can be moved to its first position or its second position with it operating together with the first catch 411.

The main body 31*a* of the holding apparatus 30*a* restricts movement of the contactless recording medium 10 inserted into the main body 31*a* through the insert portion 32 thereof. When the contactless recording medium 10 is slid on the attaching surface 411*p* of the first catch 411, the contactless recording medium 10 is prevented from being moved along an urging direction generated with an urge by the elastic members 43, 44. Therefore, when the inserting contactless recording medium 10 is slid on the attaching surface 411*p* of the first catch 411, any force generated against the urge by the elastic members 43, 44 is applied to the catching device 40. This causes the first catch 411 to be changed from its first position for catching the contactless recording medium 10 to its second position where the first catch 411 is received in the channel 25 to avoid catching the contactless recording medium 10. Further, since the first and second arms operate together, the second catch 421 can be also moved from its first position to its second position together with the first catch 411.

A distance between the first and second catches 411, 421 is set to have a length slightly longer than a whole length of a longitudinal side of the inserted contactless recording medium 10 on its insert direction. The catching device 40 is configured so that, when the contactless recording medium 10 is inserted into the main body 31*a* by a previously set position thereof, the contactless recording medium 10 has been passed through the first catch 411. Thus, when the contactless recording medium 10 is inserted into the main body 31*a* by the previously set position thereof, the first and second catches 411, 421 move to their first positions where the first and second catches 411, 421 project exceeding the surface of the reader/writer 20 by means of the urge of the elastic members 43, 44. In other words, the first catch 411 catches the rear end of the contactless recording medium 10 that has been inserted into the main body 30*a* by the previously set position and the second catch 421 catches the front end of the contactless recording medium 10 that has been inserted into the main body 30*a* by the previously set position. These first and second catches 411, 421 allow the contactless recording medium 10 to be held at the previously set position.

The first arm 41 also has a release-operating member 415. The release-operating member 415 forces the first and second catches 411, 421 to move from their first positions to their second positions to release the contactless recording medium 10 from its caught posture. The release-operating member 415 is operated by the user.

The following will describe an insert operation of the contactless recording medium 10. It is to be noted that in FIGS. 9A through 9E, the release-operating member 415 is omitted.

As shown in FIG. 9A, when the user inserts the contactless recording medium 10 into the main body 31*a* of the holding apparatus 30*a* through the insert portion 32 thereof, the contactless recording medium 10 is slid on the attaching surface 411*p* of the first catch 411. When the contactless recording medium 10 is slid on the attaching surface 411*p* of the first catch 411, any force generated by the urge with the elastic members 43, 44 is applied to the contactless recording medium 10. The movement of the contactless recording medium 10, however, is restricted by the main body 31*a*, so that the first catch 411 is received in the channel 25 and moved from its first position to its second position, as shown in FIG. 9B. Further, since the second catch 421 operates together with the first catch 411, the second catch 421 is also received in the channel 25.

When the rear end of the inserted contactless recording medium 10 passes through the first catch 411, the first and second catches 411, 421 return, by the elastic members 43, 44, to their first positions where they project exceeding the surface of the reader/writer 20, as shown in FIG. 9C. As described above, the distance between the first and second catches 411, 421 is slightly longer than the whole length of a longitudinal side of the inserted contactless recording medium 10 on its insert direction. Therefore, the first catch 411 can catch the rear end of the contactless recording medium 10 and the second catch 421 can catch the front end of the contactless recording medium 10, thereby enabling the contactless recording medium 10 to be held at the previously set position by the first and second catches 411, 421.

When detaching the held contactless recording medium 10 from the holding apparatus 30a, as shown in FIG. 9D, the user operate the release-operating member 415, not shown, to move the first catch 411 in a direction of an arrow F shown in FIG. 9D, thereby enabling the first catch 411 to move toward its second position where it is received in the channel 25. At the same time, the second catch 421 operates together with the first catch 411 to move toward its second position. This enables the contactless recording medium 10 to be released from its caught posture by the first and second catches 411, 421. Thus, if a direction of the holding apparatus 30a is set so that the held contactless recording medium 10 can be dropped, the held contactless recording medium 10 is ejected from the holding apparatus 30a, as shown in FIG. 9E. The contactless recording medium 10 can be temporarily held at a position of the cut portion 312 in the main body 31a and then, detached therefrom.

According to the holding apparatus 30a as this embodiment, it is possible to exchange the contactless recording media easily by only inserting a new contactless recording medium into the main body thereof when the contactless recording medium has been inserted thereinto.

FIGS. 10A through 10C illustrate an exchange operation of the contactless recording media 10c, 10d. It is to be noted that in FIGS. 10A through 10C, the release-operating member 415 is omitted similar to a case shown in FIGS. 9A through 9E.

As shown in FIG. 10A, the holding apparatus 30a holds the contactless recording medium 10c. In this moment, the new contactless recording medium 10d is inserted into the main body 31a of the holding apparatus 30a through the insert portion 32 thereof, the newly inserted contactless recording medium 10d slides on the attaching surface 411p of the first catch 411. This causes the first catch 411 to be moved to its second position where it is received in the channel 25, as shown in FIG. 10B. Further, the second catch 421 operates together with the first catch 411 to move to its second position. Thus, inserting the newly inserted contactless recording medium 10d enables the held contactless recording medium 10c to be released from its caught posture, thereby allowing the contactless recording medium 10c to be detached.

When the newly inserted contactless recording medium 10d passes through the first catch 411, as shown in FIG. 10C, the first and second catches 411, 421 return to their first positions where they project exceeding the surface of the reader/writer 20 by the elastic members 43, 44. The first catch 411 catches the rear end of the newly inserted contactless recording medium 10d and the second catch 421 catches the front end of the newly inserted contactless recording medium 10d, thereby enabling the newly inserted contactless recording medium 10d to be held at a desired position by the first and second catches 411, 421.

Thus, according to this embodiment, it is possible to hold the contactless recording medium surely by the catches at a position where the contactless recording medium can transmit any signal and/or any power to the reader/writer by only inserting the new contactless recording medium into the holding apparatus 30a through the insert portion thereof. Further, even if the holding apparatus 30a faces any shock or like, it is capable to make the contactless recording medium hard to be detached from the holding apparatus 30a. Further, when the contactless recording media are exchanged, it is possible to insert the contactless recording medium or exchange the contactless recording media easily and rapidly by only inserting the new contactless recording medium into main body of the holding apparatus 30a through the insert portion thereof.

It is to be noted that if an attaching surface of the second catch 421, which attaches the forward end of the contactless recording medium 10 when the contactless recording medium 10 is inserted, has such a configuration as to allow the inserting contactless recording medium 10 to be slid thereon, the holding apparatus having no limitation of an insert direction of the contactless recording medium may be provided.

The above embodiments of an apparatus for holding the contactless recording medium according to the invention are applicable to any electronic equipment in which data can be written into a replaceable recording medium or data recorded in the replaceable recording medium can be read from it. For example, to electronic equipment in which as the replaceable recording medium, the contactless recording medium is used in place of or in addition to a recording medium such as a video tape, a magnetic disk, an optical disk or contact-type recording medium, the above embodiments of an apparatus for holding the contactless recording medium are applicable.

Figure 11:
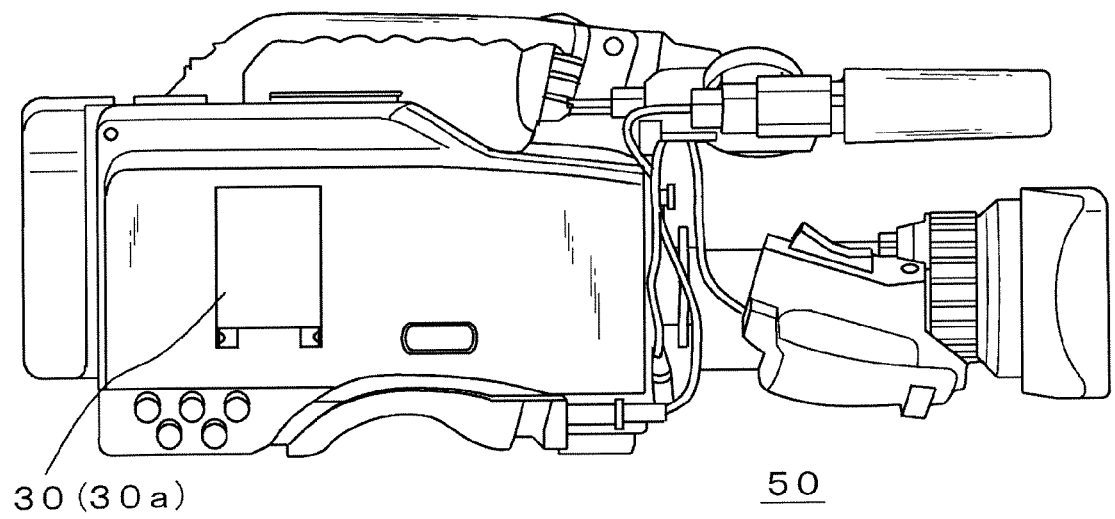
FIG. 11 is an exterior view of imaging equipment.
Figure 12:
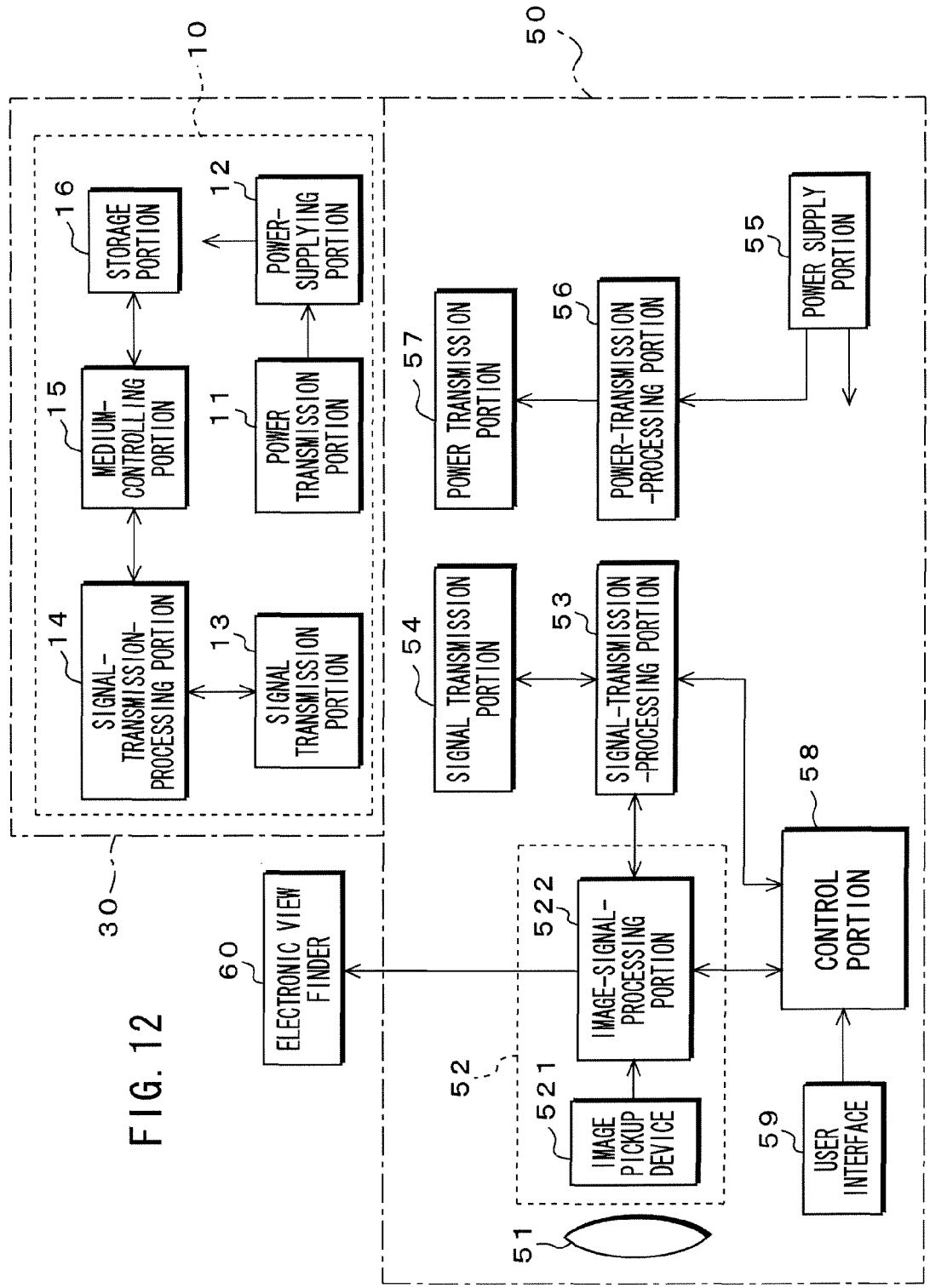
FIG. 12 is a block diagram for showing a configuration of the imaging equipment.

FIG. 11 shows imaging equipment in which it has any reader/writer function so that the contactless recording medium can be used and to which the apparatus 30 (30a) for holding the contactless recording medium are applied. FIG. 12 shows a configuration of the imaging equipment in which the contactless recording medium can be used and a configuration of this contactless recording medium. It is to be noted that in FIG. 12, like reference numbers refer to like elements similar to those shown in FIG. 1, detailed description of which will be omitted.

An image pickup device 521 of imaging portion 52 in the imaging equipment 50 receives light incident through an imaging lens 51 so that an image of a subject is formed on an imaging area thereof. The image pickup device 521 is constituted of solid-state image sensing device such as charge-coupled device (CCD) or complementary metal oxide silicon (CMOS) and outputs an image signal based on the image of the subject that is generated by photoelectric conversion.

An image-signal-processing portion 522 performs any noise-rejection on the image signal output from the image pickup device 521 and an analog-to-digital (A/D) conversion thereon. The image-signal-processing portion 522 also performs any processing such as gamma processing and/or knee compensation processing using image data obtained by the A/D conversion. The image-signal-processing portion 522 further performs compression processing on processed image data or extension processing on compressed image data or the like. The image-signal-processing portion 522 additionally supplies an electronic view finder 60 with the image data. The electronic view finder 60 then displays an imaging image or a recorded image that is reproduced.

A signal-transmission-processing portion 53 is connected to a signal transmission portion 54 that has the same configuration as that of the signal transmission portion 13. The signal-transmission-processing portion 53 performs the image data received from the image-signal-processing portion 522 so that a signal transmission can be performed using the interwire coupling between the signal transmission portion 13 and the signal transmission portion 54 to generate a high frequency signal. The signal-transmission-processing portion 53 then supplies the signal transmission portion 54 with the generated high frequency signal. The signal-transmission-processing portion 53 also processes a high frequency signal received from the signal transmission portion 54 to obtain image data read from the contactless recording medium 10 and supplies the image-signal-processing portion 522 with the read image data. For example, the signal-transmission-processing portion 53 transmits the image data received from the image-signal-processing portion 522 using a wireless communication scheme such as ultra wide band (UWB).

A power supply portion 55 supplies power to each portion of the imaging equipment 50. A power-transmission-processing portion 56 supplies alternating current to a flat coil of a power transmission portion 57 that has the same configuration as that of the power transmission portion 11. For example, the power-transmission-processing portion 56 supplies the alternating current thereto by switching direct current received from the power supply portion 55 and changing in polarity of voltage applied across the terminals of the flat coil at a predetermined frequency.

A control portion 58 has a user interface 59. The control portion 58 generates control signals based on a manipulation signal received from the user interface 59 and controls operations of the imaging portion 52, the signal-transmission-processing portion 53, and the power-transmission-processing portion 56 by using such the control signal.

In the imaging equipment 50 thus configured, when the user records images, the control portion 58 controls the operation of the power-transmission-processing portion 56 based on the control signal received from the user interface 59 to supply power to the contactless recording medium 10. The control portion 58 also controls the operation of the signal-transmission-processing portion 53 to perform any writing processing by supplying the image data on imaged image to the contactless recording medium 10.

When the user reproduces a recorded image, the control portion 58 also controls the operation of the power-transmission-processing portion 56 based on the control signal received from the user interface 59 to supply power to the contactless recording medium 10. The control portion 58 further controls the operation of the signal-transmission-processing portion 53 to request the contactless recording medium 10 to send the image data thereto and based on the image data read from the contactless recording medium 10, the electronic view finder 60, for example, displays the image.

When the user exchanges the contactless recording media, he or she may exchange them by only inserting a new contactless recording medium into the apparatus for holding the contactless recording medium through the insert portion thereof. This allows the contactless recording media to be easily and rapidly exchanged, which enables a period of interrupted imaging time to be shortened. Further, according to the above embodiment, even if the contactless recording medium is ejected from the eject portion of the apparatus for holding the contactless recording medium, the ejected contactless recording medium is kept held. This prevents the ejected contactless recording medium from being damaged by any mechanical shock such as a drop thereof.

Although the embodiments of the apparatus for holding the contactless recording medium according to the invention have been applied to the imaging equipment, this invention is not limited thereto. This invention is applicable to a various kinds of electronic equipment such as television device, audio device, communication device, information terminal device, and the like, which have any reader/writer functions.

Although the signal-transmission-processing portion 53 has been described to use UWB, it can use any other transmission processes by changing a frequency band of the signal transmission portion 54.

Although the contactless recording medium 10 has been described as the recording medium, a contact-type recording medium such as a memory card can be used as the recording medium in the embodiments of the invention.

It should be understood by those skilled in the art that various modifications, combinations, sub-combinations and alternations may occur depending on design requirements and other factors insofar as they are within the scope of the appended claims or the equivalents thereof.

What is claimed is:

1. An apparatus for holding a recording medium including an engagement member that is disposed at a rear portion of the recording medium with respect to an insert direction of the recording medium, said apparatus comprising:
    a main body including
        an insert portion on a first end of the main body, the insert portion allowing insertion of the recording medium into the main body, and
        an eject portion on a second end of the main body, the eject portion allowing ejection of the recording medium from the main body, the recording medium being ejected when a substitute recording medium is inserted via the insert portion and pushes the inserted recording medium;
    a first engagement device that engages an engagement member of the recording medium when the recording medium is inserted to a predetermined position and holds the recording medium, said first engagement device disposed in the main body; and
    a second engagement device that engages the engagement member of the recording medium when the recording medium is ejected from the main body through the ejection portion and holds the recording medium after ejection, said second engagement device disposed in the main body on a side of the eject portion.

2. The apparatus for holding a recording medium according to claim 1, wherein the recording medium is ejected from the main body by pushing during insertion of the substitute recording medium into the main body through the insert portion thereof; and
    wherein the second engagement device engages the engagement member of the recording medium after ejection when the substitute recording medium is inserted to the predetermined position in the main body.

3. The apparatus for holding a recording medium according to claim 1, further comprising:
    a reader/writer that reads and writes data from and to the recording medium; and
    a pushing member that pushes the recording medium against the reader/writer.

4. The apparatus for holding a recording medium according to claim 1 further comprising a reader/writer that reads and writes data from and to the recording medium,
    wherein the predetermined position includes a position in the main body where the recording medium enables data to be transmitted to the reader/writer.

5. The apparatus for holding a recording medium according to claim 1, wherein the first and second engagement devices include a resilient protrusion that corresponds to a recess, which is the engagement member disposed on the recording medium.

6. The apparatus for holding a recording medium according to claim 1, wherein the main body further includes a catching device, and wherein the catching device includes first and second arms, the first arm including a first catch and the second arm including a second catch, the first and second catches securing the recording medium after insertion.

7. The apparatus for holding a recording medium according to claim 6, wherein the first and second arms of the catching device pivot with respect to each other in response to insertion of the recording medium.

* * * * *